United States Patent
Yu et al.

(10) Patent No.: US 12,000,012 B2
(45) Date of Patent: Jun. 4, 2024

(54) METHOD FOR EXTRACTING NICKEL FROM HIGH MATTE NICKEL LEACHING RESIDUE

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Yinghao Xie, Guangdong (CN); Aixia Li, Guangdong (CN); Xuemei Zhang, Guangdong (CN); Changdong Li, Guangdong (CN)

(73) Assignees: GUANGDONG BRUNP RECYCLING TECHNOLOGY CO, LTD., Guangdong (CN); HUNAN BRUNP RECYCLING TECHNOLOGY CO., LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/552,447

(22) PCT Filed: Jun. 6, 2022

(86) PCT No.: PCT/CN2022/097174
§ 371 (c)(1),
(2) Date: Sep. 26, 2023

(87) PCT Pub. No.: WO2023/005428
PCT Pub. Date: Feb. 2, 2023

(65) Prior Publication Data
US 2024/0084421 A1     Mar. 14, 2024

(30) Foreign Application Priority Data
Jul. 29, 2021   (CN) .......................... 202110866011.8

(51) Int. Cl.
  *C22B 3/00*   (2006.01)
  *C01G 3/10*   (2006.01)
  (Continued)

(52) U.S. Cl.
  CPC ............ *C22B 23/0461* (2013.01); *C01G 3/10* (2013.01); *C22B 3/22* (2013.01); *C22B 3/44* (2013.01)

(58) Field of Classification Search
  CPC ......... C22B 23/0461; C22B 3/22; C22B 3/44; C01G 3/10
  (Continued)

(56) References Cited

FOREIGN PATENT DOCUMENTS

| CN | 1544664 A | 11/2004 |
|----|-----------|---------|
| CN | 101381810 A | 3/2009 |

(Continued)

OTHER PUBLICATIONS

CN 107630146A Translation (Year: 2018).*
International Search Report for PCT/CN2022/097174 dated Sep. 5, 2022, ISA/CN.

*Primary Examiner* — Brian D Walck
*Assistant Examiner* — Danielle Carda
(74) *Attorney, Agent, or Firm* — Yue (Robert) Xu; Apex Attorneys at Law, LLP

(57) ABSTRACT

Disclosed in the present invention is a method for extracting nickel from a high matte nickel leaching residue. The method comprises: firstly, adding a crushed material of a high matte nickel leaching residue to an organic solvent in which sulfur is dissolved, heating same for reaction, and carrying out solid-liquid separation to obtain a first filtrate
(Continued)

and a first filter residue; adding the first filter residue to a copper sulfate solution, heating same for reaction, and carrying out solid-liquid separation to obtain a second filtrate and a second filter residue; and evaporating, condensing and concentrating the second filtrate, and filtering same to obtain copper sulfate crystals and a nickel-containing filtrate. Throughout the whole reaction, only a small amount of sulfur and copper sulfate are consumed, and the organic solvent can be recycled.

3 Claims, 1 Drawing Sheet

(51) Int. Cl.
  *C22B 3/22* (2006.01)
  *C22B 3/44* (2006.01)
(58) Field of Classification Search
  USPC .......................................................... 75/743
  See application file for complete search history.

(56) References Cited

FOREIGN PATENT DOCUMENTS

| | | | |
|---|---|---|---|
| CN | 107630146 A | * | 1/2018 |
| CN | 107630146 A | | 1/2018 |
| CN | 110342590 A | | 10/2019 |
| CN | 212127522 U | | 12/2020 |
| CN | 113755698 A | | 12/2021 |
| JP | 2018150183 A | | 9/2018 |
| KR | 101191042 B1 | | 10/2012 |

* cited by examiner

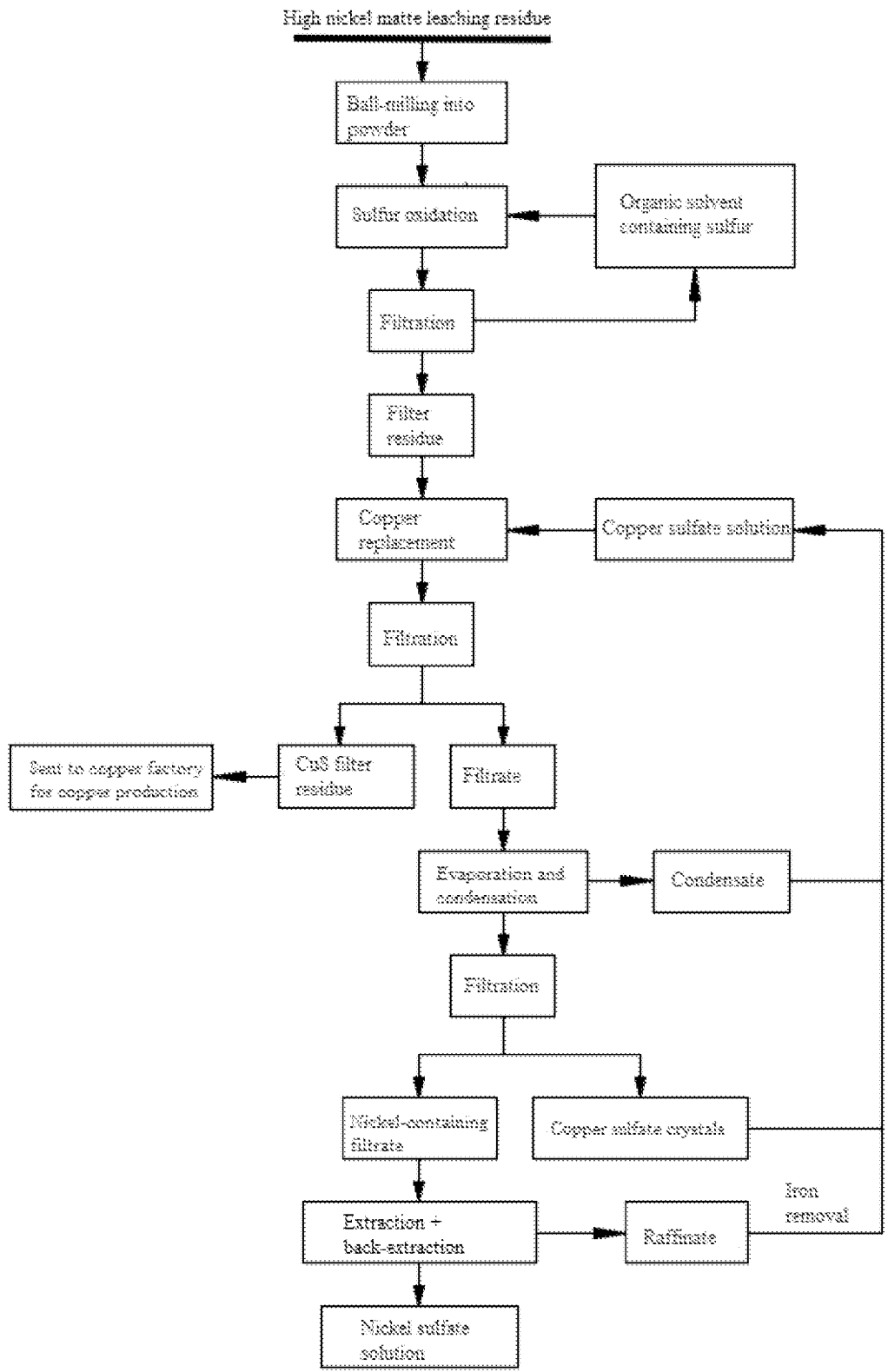

METHOD FOR EXTRACTING NICKEL FROM HIGH MATTE NICKEL LEACHING RESIDUE

This application is the national phase of International Application No. PCT/CN2022/097174, titled "METHOD FOR EXTRACTING NICKEL FROM HIGH MATTE NICKEL LEACHING RESIDUE", filed on Jun. 6, 2022, which claims the priority to Chinese Patent Application No. 202110866011.8, titled "METHOD FOR EXTRACTING NICKEL FROM HIGH MATTE NICKEL LEACHING RESIDUE", filed on Jul. 29, 2021 with the China National Intellectual Property Administration, which are incorporated herein by reference in entirety.

FIELD

The present invention relates to the technical field of metallurgy, specifically to method for extracting nickel from high nickel matte leaching residue.

BACKGROUND

High nickel matte is a sulfide eutectic of metals such as nickel, copper, cobalt and iron, generated by primary smelting of nickel concentrate through electric converter. It can be used to produce electrolytic nickel, nickel oxide, ferronickel, nickel-containing alloys and various nickel salts, and it can also be directly used for steelmaking after special treatment.

After finely grinding and pulverizing high nickel matte, and then separating by flotation and magnetic separation, a nickel concentrate containing 67%-68% of nickel is obtained. Meanwhile, copper concentrate and copper-nickel alloy are selected to recover copper and platinum group gold, respectively. The nickel concentrate is melted in a reverberatory furnace to obtain nickel sulfide, which is then subjected to electrolytic refining or reduction smelting in an electric furnace (or a reverberatory furnace) to obtain crude nickel, which is then subjected to electrolytic refining.

High nickel matte can be used to produce electrolytic nickel using conventional electrolysis process, and can also be used to produce nickel sulfate using high pressure leaching process. In this way, through high nickel matte as an intermediate product, several nickel products such as electrolytic nickel, ferronickel, and nickel sulfate can be mutually transformed and balanced in the market, which will generally benefit the healthy and stable development of the market.

In addition, with the rapid development of the electric vehicle market, the demand for cobalt and nickel sulfate for power batteries has increased. The main raw materials for preparing nickel sulfate include high nickel matte, intermediate products of nickel by hydrometallurgy, nickel beans/nickel powder, and waste nickel. Among them, the preparation of nickel sulfate from high nickel matte by high pressure acid leaching is the main source of nickel sulfate products currently. This process has the characteristics of short process flow, strong raw material adaptability, high recovery rate of valuable metals, and little solution residue, and is widely used.

However, after the three-stage sulfuric acid selective leaching of high nickel matte, the nickel content in the leaching residue is still high, resulting in a waste of nickel resources. The forms of the elements in high nickel matte leaching residue are relatively complex, mainly including $CuS$, $Cu_2S$, $NiS$, $Ni_3S_2$, $FeS$, $CuFeS_2$, elemental sulfur, and nickel-iron-copper alloys, etc. At present, there is no effective method for the recovery and process of nickel in high nickel matte leaching residue.

Therefore, there is an urgent need for a processing method for high nickel matte leaching residue to extract nickel element in the leaching residue and improve the utilization rate of nickel resources.

SUMMARY

The present disclosure aims to solve at least one of the technical problems existing in the above-mentioned prior art. For this reason, the present invention proposes a method for extracting nickel from high nickel matte leaching residue. The method first converts the complex components of high nickel matte leaching residue into simple components and then replaces and extracts the nickel element in it.

According to one aspect of the present invention, a method for extracting nickel from high nickel matte leaching residue is provided, comprising the following steps:
 S1: adding a pulverized material of high nickel matte leaching residue to an organic solvent in which sulfur is dissolved, heating to perform the reaction, and performing solid-liquid separation to obtain a first filtrate and a first filter residue;
 S2: adding the first filter residue to a copper sulfate solution, heating to perform the reaction, and performing solid-liquid separation to obtain a second filtrate and a second filter residue;
 S3: evaporating, condensing, and concentrating the second filtrate, and performing filtration to obtain copper sulfate crystals and a nickel-containing filtrate.

In some embodiments of the present invention, in step S1, the organic solvent is selected from one or more of carbon disulfide, carbon tetrachloride, methylcyclohexane, trichloroethane, trichloroethylene, tetrachloroethane, diethylene glycol dimethyl ether, tetrahydronaphthalene, and decahydronaphthalene.

In some embodiments of the present invention, in step S1, the concentration of the sulfur in the organic solvent is 10-700 g/L.

In some embodiments of the present invention, in step S1, a solid-to-liquid ratio of the pulverized material to the organic solvent is 1 g:(0.5-5) mL.

In some embodiments of the present invention, in step S1, the temperature of the heating is 80-120° C.; preferably, the time of the reaction is 1-5 h. Elemental sulfur can only oxidize metals to subions, e.g., $Cu_2S$, under ordinary heating conditions, while elemental sulfur in CS2 solution can oxidize metals to ions, e.g., CuS, at 100° C. Therefore, the oxidation performance of sulfur can be improved under the aforementioned reaction conditions.

In some embodiments of the present invention, in step S1, the first filtrate is an organic solvent, which can be recycled after supplementing with sulfur.

In some embodiments of the present invention, in step S2, the concentration of the copper sulfate solution is 0.1-4.0 mol/L, more preferably, 2.0-4.0 mol/L. The higher the concentration of the copper sulfate solution, the faster the reaction speed, and the more complete the replacement of nickel ions and ferrous ions.

In some embodiments of the present invention, in step S2, the solid-to-liquid ratio of the first filter residue to the copper sulfate solution is 1 g:(0.5-5) mL.

In some embodiments of the present invention, in step S2, the temperature of the heating is 80-180° C.; preferably, a time of the reaction is 2-8 h.

In some embodiments of the present invention, in step S2, the second filter residue is used for making copper, and the second filter residue is CuS.

In some embodiments of the present invention, in step S3, the condensate produced by evaporation and condensation and the copper sulfate crystals can be prepared as copper sulfate solution for recycling.

In some embodiments of the present invention, in step S3, an extractant is added to the nickel-containing filtrate to perform extraction, and the filtrate is left to stand and separated to obtain a nickel-containing extraction organic phase and a raffinate; and then nickel is back-extracted from the nickel-containing extraction organic phase with a sulfuric acid solution to obtain a nickel sulfate solution.

In some preferred embodiments of the present invention, the extractant is selected from one or more of P204, P507, DEHPA, and Cyanex272; preferably, the extraction organic phase obtained after the back-extraction can be re-saponified and recycled.

In some preferred embodiments of the present invention, the raffinate can be recycled as copper sulfate solution after iron removal.

According to a preferred embodiment of the present invention, the present invention has at least the following beneficial effects:
1. The present invention first converts the complex components of high nickel matte leaching residue into simple components and then replaces and extracts the nickel element in it. By utilizing the oxidizing property of a sulfur element in organic solvents, $Cu_2S$, $Ni_3S_2$, $CuFeS_2$, and nickel-iron copper alloy in high nickel matte leaching residue are oxidized into CuS, NiS, and FeS, and in the presence of organic solvents, the elemental sulfur in high nickel matte leaching residue is dissolved in the solvent; for nickel and iron in high nickel matte leaching residue, conventional acid leaching cannot be carried out, and since copper ions are easier to precipitate than hydrogen ions and the solubility product constant of CuS is smaller and it is more difficult to dissolve, copper sulfate solution is used to replace NiS and FeS with more insoluble CuS, while nickel ions and ferrous ions enter the solution, further increasing the copper content in the leaching residue, which is beneficial to subsequent copper smelting.
2. During the entire reaction process, only a small amount of sulfur and copper sulfate are consumed, the organic solvent can be recycled and reused, and the condensate in the evaporation and condensation process and the precipitated copper sulfate crystals can be reused. The present invention has a short process flow, makes the best use of materials, consumes less auxiliary materials, has low costs, and is quick to take effect, which is suitable for industrial promotion.

BRIEF DESCRIPTION OF DRAWINGS

The present disclosure is further described below in conjunction with the drawings and embodiments, in which:
FIG. 1 is a schematic diagram of the process flow of Example 1 of the present invention.

DETAILED DESCRIPTION

Hereinafter, the concept of the present disclosure and the technical effects produced by the present disclosure will be described clearly and completely in conjunction with the embodiments, so as to fully understand the purpose, features, and effects of the present disclosure. The described embodiments are only a part of the embodiments of the present disclosure, rather than all of them. All the other embodiments obtained by those skilled in the art based on the embodiments of the present disclosure without any creative work fall into the scope of the present disclosure.

Example 1

In this example, nickel was extracted from high nickel matte leaching residue and nickel sulfate was prepared. The composition of the high nickel matte leaching residue was: nickel 7.38%, copper 42.3%, iron 10.9%, sulfur 23.35%. This example was carried out through the following steps, and reference could be made to FIG. 1:
(1) Raw material pretreatment: The high nickel matte leaching residue was ball-milled into powder;
(2) Sulfur oxidation: Carbon disulfide in which sulfur was dissolved with a sulfur concentration of 700 g/L was added to the powder material obtained in step (1), and the solid-liquid ratio was controlled at 1 g:0.5 mL. The temperature of the reaction was 120° C., and the time of the reaction was 1 h;
(3) Filtration treatment: After the reaction in step (2) was completed, the solid-liquid separation was performed to obtain a filtrate and filter residue. The filtrate was an organic solvent, which can be recycled after supplementing with sulfur;
(4) Copper replacement: Copper sulfate solution with a concentration of 4.0 mol/L was added to the filter residue obtained in step (3), and the solid-liquid ratio of the filter residue to the copper sulfate solution was controlled at 1 g:0.5 mL. The temperature of the reaction was 180° C., and the time of the reaction was 2 h;
(5) Filtration: After the reaction in step (4) was completed, the solid-liquid separation was performed to obtain a filtrate and CuS filter residue, and the CuS filter residue was sent to the copper factory for copper production;
(6) Evaporation and condensation: The filtrate obtained in step (5) was evaporated, condensed, and then filtered to obtain copper sulfate crystals and nickel-containing filtrate. The condensate produced by evaporation and condensation and the copper sulfate crystals obtained by filtration can be prepared as copper sulfate solution for recycling;
(7) Extraction treatment: The nickel-containing filtrate in step (6) was extracted with the extractant P204. After standing and separating, a nickel-containing extraction organic phase and a raffinate were obtained. Nickel was back-extracted from the nickel-containing extraction organic phase with a 5 mol/L sulfuric acid solution to obtain a nickel sulfate solution. The obtained extraction organic phase can be re-saponified and recycled, and the raffinate was recycled as copper sulfate solution after iron removal.

The CuS filter residue was tested and the composition included nickel 0.36%, copper 59.86%, iron 0.93%, and sulfur 28.22%. It shows that nickel and iron were basically leached after the copper displacement reaction.

Example 2

In this example, nickel was extracted from high nickel matte leaching residue and nickel sulfate was prepared. The composition of the high nickel matte leaching residue was:

nickel 5.58%, copper 55.7%, iron 8.66%, sulfur 20.37%. This example was carried out through the following steps:

(1) Raw material pretreatment: The high nickel matte leaching residue was ball-milled into powder;

(2) Sulfur oxidation: Carbon tetrachloride in which sulfur was dissolved with a sulfur concentration of 10 g/L was added to the powder material obtained in step (1), and the solid-liquid ratio was controlled at 1 g:5 mL. The temperature of the reaction was 80° C., and the time of the reaction was 5 h;

(3) Filtration treatment: After the reaction in step (2) was completed, the solid-liquid separation was performed to obtain a filtrate and filter residue. The filtrate was an organic solvent, which can be recycled after supplementing with sulfur;

(4) Copper replacement: Copper sulfate solution with a concentration of 0.1 mol/L was added to the filter residue obtained in step (3), and the solid-liquid ratio of the filter residue to the copper sulfate solution was controlled at 1 g:5 mL. The temperature of the reaction was 80° C., and the time of the reaction was 8 h;

(5) Filtration: After the reaction in step (4) was completed, the solid-liquid separation was performed to obtain a filtrate and CuS filter residue, and the CuS filter residue was sent to the copper factory for copper production;

(6) Evaporation and condensation: The filtrate obtained in step (5) was evaporated, condensed, and then filtered to obtain copper sulfate crystals and nickel-containing filtrate. The condensate produced by evaporation and condensation and the copper sulfate crystals obtained by filtration can be prepared as copper sulfate solution for recycling;

(7) Extraction treatment: The nickel-containing filtrate in step (6) was extracted with the extractant P507. After standing and separating, a nickel-containing extraction organic phase and a raffinate were obtained. Nickel was back-extracted from the nickel-containing extraction organic phase with a 3 mol/L sulfuric acid solution to obtain a nickel sulfate solution. The obtained extraction organic phase can be re-saponified and recycled, and the raffinate was recycled as copper sulfate solution after iron removal.

The CuS filter residue was tested and the composition included nickel 0.47%, copper 65.52%, iron 0.75%, and sulfur 25.22%. It shows that nickel and iron were basically leached after the copper displacement reaction.

Example 3

In this example, nickel was extracted from high nickel matte leaching residue and nickel sulfate was prepared. The composition of the high nickel matte leaching residue was: nickel 6.28%, copper 58.73%, iron 9.32%, sulfur 17.23%. This example was carried out through the following steps:

(1) Raw material pretreatment: The high nickel matte leaching residue was ball-milled into powder;

(2) Sulfur oxidation: Decahydronaphthalene in which sulfur was dissolved with a sulfur concentration of 350 g/L was added to the powder material obtained in step (1), and the solid-liquid ratio was controlled at 1 g:2.5 mL. The temperature of the reaction was 100° C., and the time of the reaction was 3 h;

(3) Filtration treatment: After the reaction in step (2) was completed, the solid-liquid separation was performed to obtain a filtrate and filter residue. The filtrate was an organic solvent, which can be recycled after supplementing with sulfur;

(4) Copper replacement: Copper sulfate solution with a concentration of 2.0 mol/L was added to the filter residue obtained in step (3), and the solid-liquid ratio of the filter residue to the copper sulfate solution was controlled at 1 g:2.5 mL. The temperature of the reaction was 130° C., and the time of the reaction was 5 h;

(5) Filtration: After the reaction in step (4) was completed, the solid-liquid separation was performed to obtain a filtrate and CuS filter residue, and the CuS filter residue was sent to the copper factory for copper production;

(6) Evaporation and condensation: The filtrate obtained in step (5) was evaporated, condensed, and then filtered to obtain copper sulfate crystals and nickel-containing filtrate. The condensate produced by evaporation and condensation and the copper sulfate crystals obtained by filtration can be prepared as copper sulfate solution for recycling;

(7) Extraction treatment: The nickel-containing filtrate in step (6) was extracted with the extractant Cyanex272. After standing and separating, a nickel-containing extraction organic phase and a raffinate were obtained. Nickel was back-extracted from the nickel-containing extraction organic phase with a 4 mol/L sulfuric acid solution to obtain a nickel sulfate solution. The obtained extraction organic phase can be re-saponified and recycled, and the raffinate was recycled as copper sulfate solution after iron removal.

The CuS filter residue was tested and the composition included nickel 0.51%, copper 64.53%, iron 0.82%, and sulfur 24.29%. It shows that nickel and iron were basically leached after the copper displacement reaction.

The embodiments of the present disclosure have been described in detail above in conjunction with the drawings. However, the present disclosure is not limited to the above-mentioned embodiments, and various modifications can be made without departing from the purpose of the present disclosure within the scope of knowledge possessed by those of ordinary skill in the art. In addition, in the case of no conflict, the embodiments of the present disclosure and the features in the embodiments may be combined with each other.

The invention claimed is:

1. A method for extracting nickel from high nickel matte leaching residue, comprising the following steps:

S1: adding a pulverized material of high nickel matte leaching residue to an organic solvent in which sulfur is dissolved, heating to perform reaction, and performing solid-liquid separation to obtain a first filtrate and a first filter residue; wherein a concentration of the sulfur in the organic solvent is 10-700 g/L; a solid-to-liquid ratio of the pulverized material to the organic solvent is 1 g:(0.5-5) mL; a temperature of the heating is 80-120° C.; and a time of the reaction is 1-5 h;

S2: adding the first filter residue to a copper sulfate solution, heating to perform reaction, and performing solid-liquid separation to obtain a second filtrate and a second filter residue; wherein a concentration of the copper sulfate solution is 0.1-4.0 mol/L; a solid-to-liquid ratio of the first filter residue to the copper sulfate solution is 1 g:(0.5-5) mL, a temperature of the heating is 80-180° C.; a time of the reaction is 2-8 h; and the second filter residue is used for making copper; and S3: evaporating, condensing and concentrating the second filtrate, and performing filtration to obtain copper sulfate crystals and a nickel-containing filtrate.

2. The method according to claim 1, wherein in step S1, the organic solvent is selected from one or more of carbon disulfide, carbon tetrachloride, methylcyclohexane, trichloroethane, trichloroethylene, tetrachloroethane, diethylene glycol dimethyl ether, tetrahydronaphthalene, and decahydronaphthalene.

3. The method according to claim 1, wherein in step S3, an extractant is added to the nickel-containing filtrate to perform extraction, and the filtrate is left to stand and separated to obtain a nickel-containing extraction organic phase and a raffinate; and then nickel is back-extracted from the nickel-containing extraction organic phase with a sulfuric acid solution to obtain a nickel sulfate solution.

\* \* \* \* \*